(12) United States Patent
Ji et al.

(10) Patent No.: US 9,870,147 B2
(45) Date of Patent: Jan. 16, 2018

(54) TOUCH CONTROL METHOD IN MOBILE TERMINAL HAVING LARGE SCREEN

(71) Applicant: Hyon Jo Ji, Seoul (KR)

(72) Inventors: Hyon Jo Ji, Seoul (KR); Man Suk Ji, Gyeonggi-do (KR)

( * ) Notice: Subject to any disclaimer, the term of this patent is extended or adjusted under 35 U.S.C. 154(b) by 39 days.

(21) Appl. No.: 14/781,007

(22) PCT Filed: Mar. 27, 2014

(86) PCT No.: PCT/KR2014/002611
§ 371 (c)(1),
(2) Date: Sep. 28, 2015

(87) PCT Pub. No.: WO2014/157961
PCT Pub. Date: Oct. 2, 2014

(65) Prior Publication Data
US 2016/0041753 A1    Feb. 11, 2016

(30) Foreign Application Priority Data

Mar. 27, 2013 (KR) .................. 10-2013-0032677
Mar. 4, 2014 (KR) .................. 10-2014-0025535

(51) Int. Cl.
*G06F 3/041* (2006.01)
*G06F 3/0488* (2013.01)
(Continued)

(52) U.S. Cl.
CPC ........ *G06F 3/04886* (2013.01); *G06F 3/0482* (2013.01); *G06F 3/04817* (2013.01);
(Continued)

(58) Field of Classification Search
USPC ........ 345/173, 175, 647, 174, 156; 715/761, 715/765, 769, 732, 771; 726/19
See application file for complete search history.

(56) References Cited

U.S. PATENT DOCUMENTS

2008/0238880 A1* 10/2008 Miwa .................. G06F 3/0416
345/173
2011/0122083 A1   5/2011 Takahashi et al.
(Continued)

FOREIGN PATENT DOCUMENTS

| KR | 1020110018589 | 2/2011 |
|----|---------------|--------|
| KR | 1020120016729 | 2/2012 |
| KR | 1020120127649 | 6/2014 |

OTHER PUBLICATIONS

International Search Report for Application No. PCT/KR2014/002611 dated Jul. 18, 2014.

*Primary Examiner* — Thuy Pardo
(74) *Attorney, Agent, or Firm* — Kunzler, PC

(57) ABSTRACT

A touch control method of a portable device which includes a display and a touch sensor relating to the display, comprises steps of sensing user's touch start and touch moving toward one direction on the touch sensor, moving an image presented on the display according to the user's touch moving, temporarily fixing the moved image, sensing user's following touch on the moved image, and activating a linked function by using coordinates of the following touch on the moved image, wherein the moved image provides an image area around an opposite border of the display to be exposed from one border of the display.

15 Claims, 4 Drawing Sheets

(51) Int. Cl.
  *G06F 3/0482* (2013.01)
  *G06F 3/0481* (2013.01)
  *G06F 3/0484* (2013.01)
(52) U.S. Cl.
  CPC ...... *G06F 3/04842* (2013.01); *G06F 3/04845* (2013.01); *G06F 3/04883* (2013.01)

(56) References Cited

U.S. PATENT DOCUMENTS

| | | | | |
|---|---|---|---|---|
| 2011/0185297 A1* | 7/2011 | Reid | ................... | G06F 3/04845 715/765 |
| 2011/0221776 A1* | 9/2011 | Shimotani | ............. | G06F 3/0421 345/647 |
| 2012/0081308 A1* | 4/2012 | Sirpal | ................... | G06F 1/1616 345/173 |
| 2012/0081310 A1* | 4/2012 | Schrock | ................ | G06F 1/1616 345/173 |
| 2012/0291120 A1* | 11/2012 | Griffin | .................... | G06F 21/36 726/19 |
| 2014/0313168 A1* | 10/2014 | Luo | ..................... | G06F 3/04886 345/175 |
| 2015/0067519 A1* | 3/2015 | Missig | ................ | G06F 3/04842 715/732 |
| 2015/0067560 A1* | 3/2015 | Cieplinski | ........... | G06F 3/04842 715/765 |
| 2015/0116239 A1* | 4/2015 | Kaplan | ............... | G06F 3/04883 345/173 |
| 2015/0345982 A1* | 12/2015 | Schmitt | ................ | G01C 21/367 715/771 |
| 2016/0062593 A1* | 3/2016 | Schrock | ................ | G06F 1/1616 715/761 |
| 2016/0103603 A1* | 4/2016 | Sirpal | ................... | G06F 1/1616 345/173 |
| 2016/0110049 A1* | 4/2016 | Cassar | .................. | G06F 1/1616 715/769 |
| 2017/0046031 A1* | 2/2017 | Sirpal | ................... | G06F 1/1616 |

\* cited by examiner

【FIG. 1】
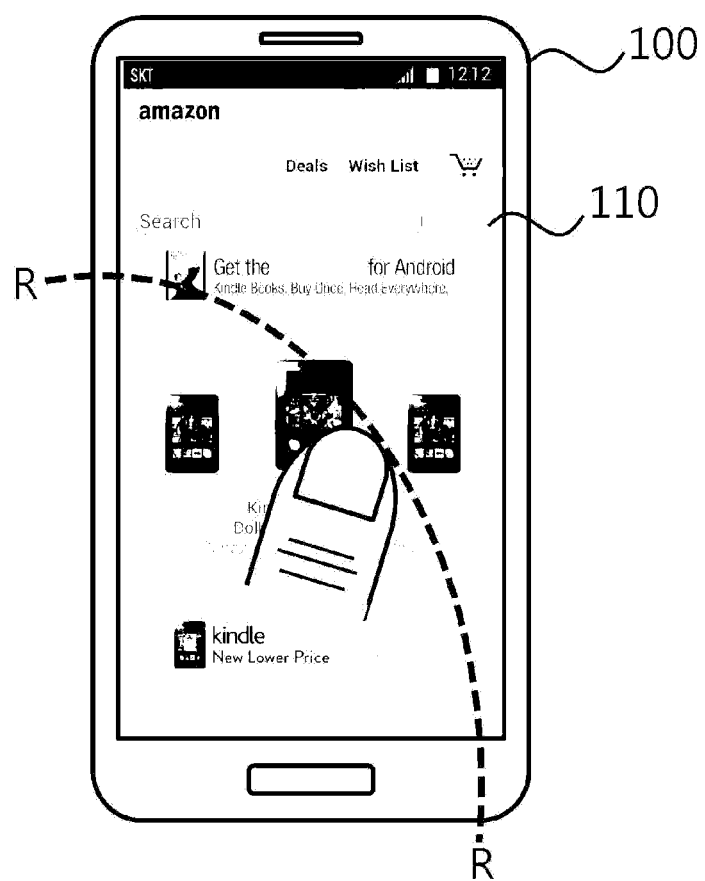

【FIG. 2】
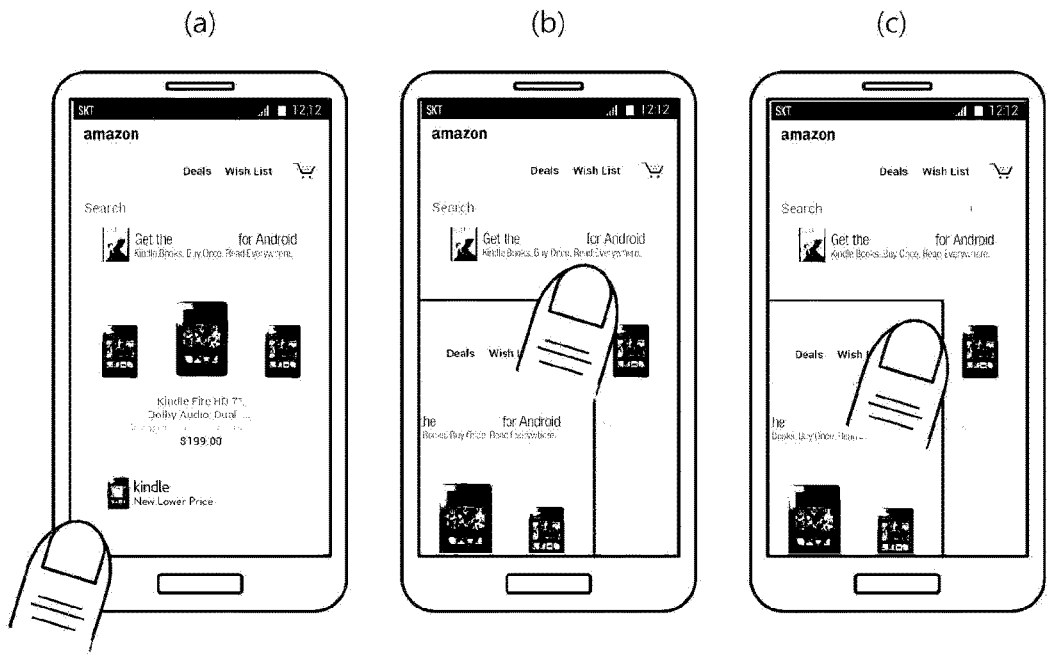
【FIG. 3】
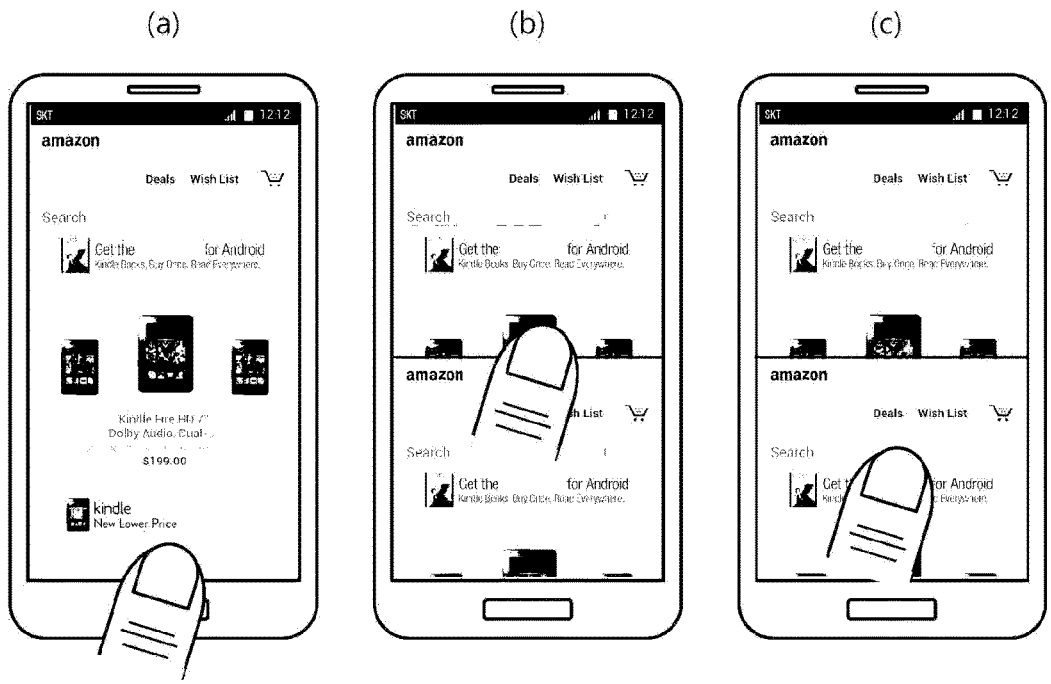

[FIG. 4]
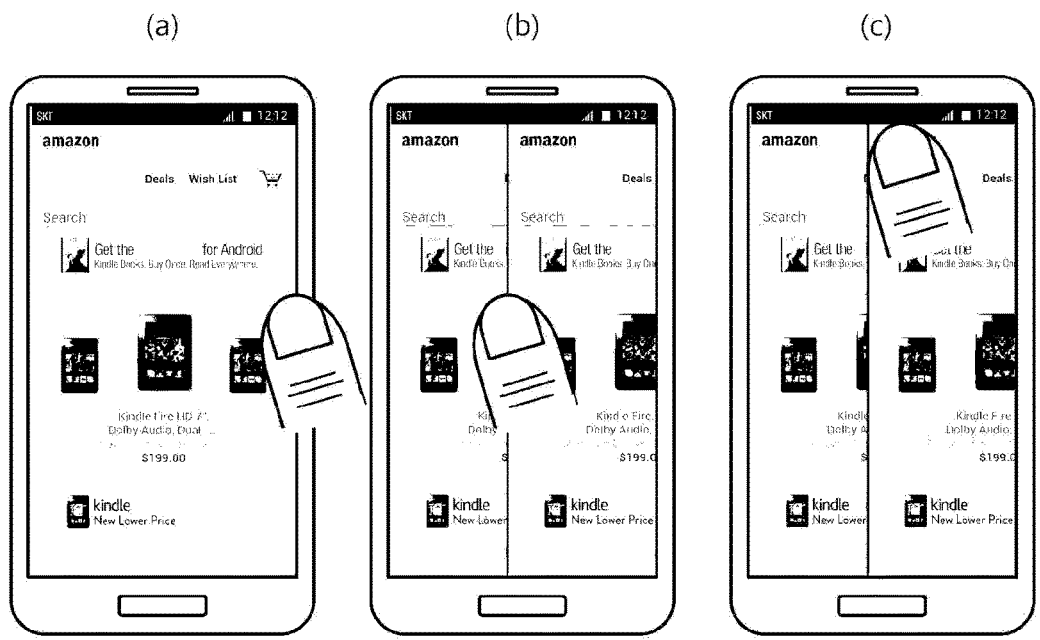
[FIG. 5]
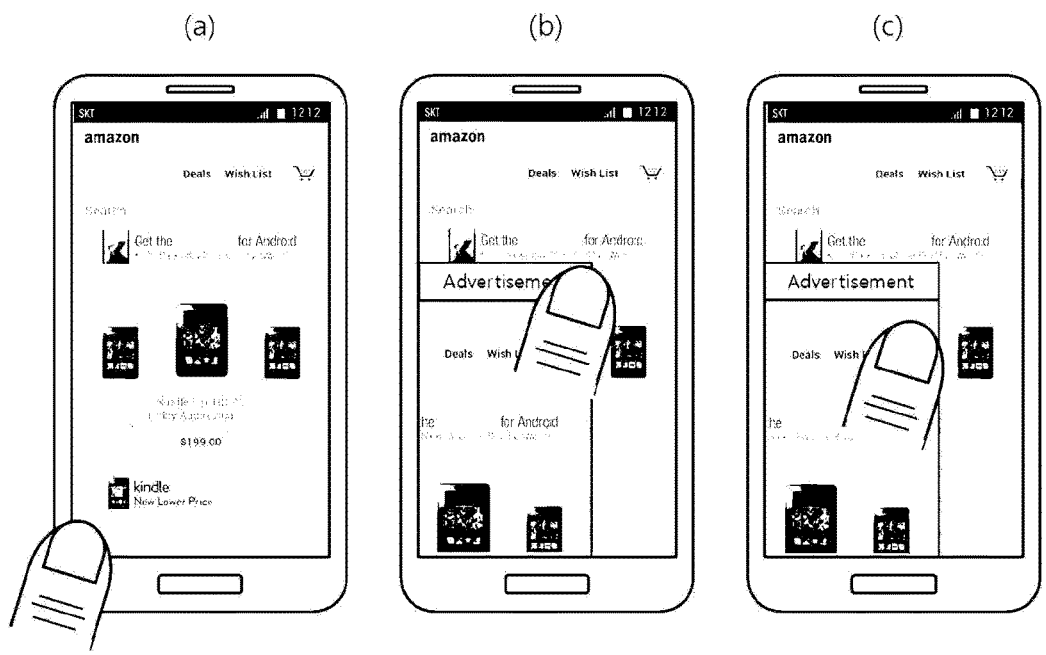

【FIG. 6】
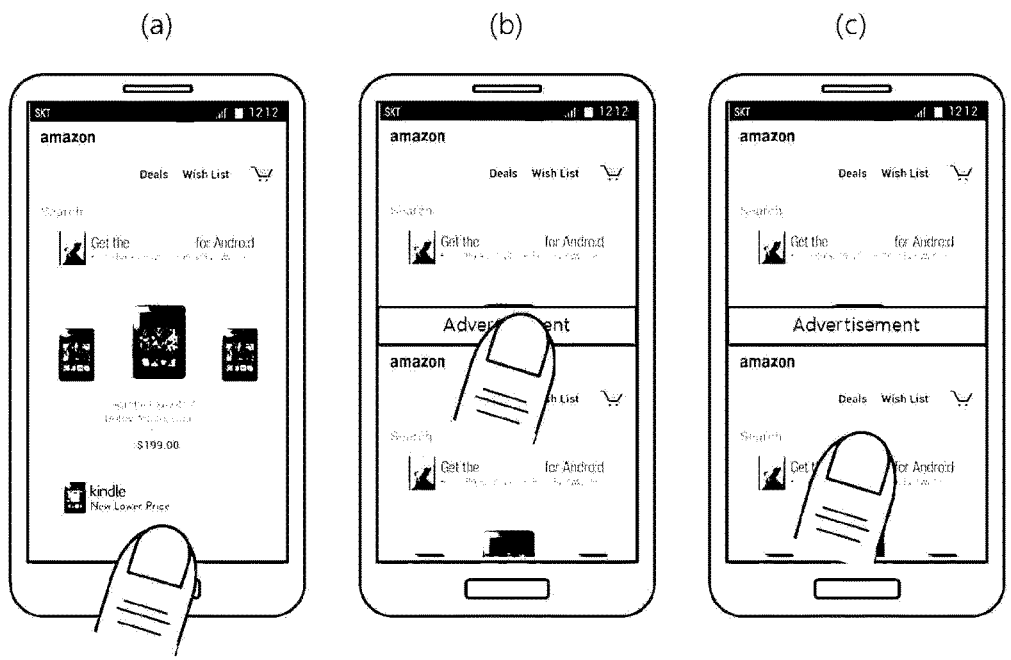
【FIG. 7】
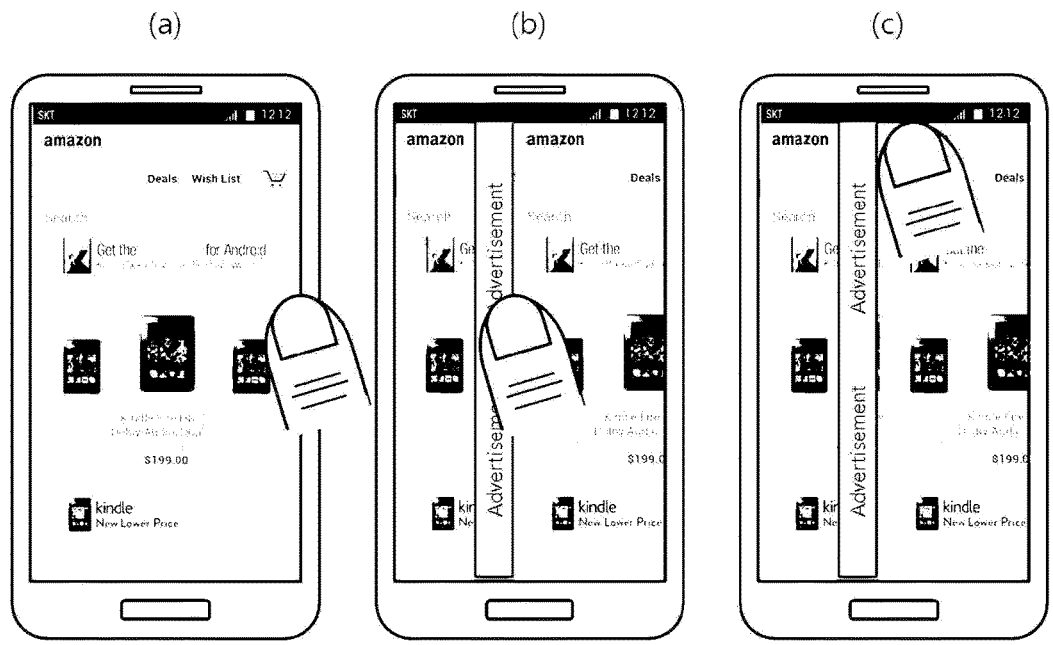

TOUCH CONTROL METHOD IN MOBILE TERMINAL HAVING LARGE SCREEN

TECHNICAL FIELD

The present invention relates to a touch control method in a portable device having a large touch screen, in order to enhance convenience of touch inputting.

BACKGROUND

Smart portable devices like smart phones, tablet computers and pad-shape devices are generally used and theirs usage is increasing. The size of the displays of them is also increasing together. In these days, touch devices having big size of displays larger than 5-inch are mainly being developed and theses trends seem like to be maintained for a long time.

The 5-inch or larger size of mobile device doesn't permit only one hand all around touch. Actually an adult man can not touch all the area of the large touch screen, by using only one hand which grip the device.

When a user cannot help but use only one hand to handle a device, there may be an accident caused by the user's careless mistake.

To overcome these problems, Korean published patent No. 10-2011-0018589 and Korean published patent No. 10-2012-0127649 disclose methods to reduce the size of the display or skew the arrangement of the icons, which cannot resolve all the inconvenience.

DETAILED DESCRIPTION

Technical Object

The present invention provides a touch control method of a portable device having a large touch screen, which can permit only one hand to reach to the objected position exactly and safely.

Technical Resolution

According to one exemplary embodiment of the present invention, a touch control method of a portable device which includes a display and a touch sensor relating to the display, comprises steps of sensing user's touch start and touch moving toward one direction on the touch sensor, moving an image presented on the display according to the user's touch moving, temporarily fixing the moved image, sensing user's following touch on the moved image, and activating a linked function by using coordinates of the following touch on the moved image, wherein the moved image provides an image area around an opposite border of the display to be exposed from one border of the display.

The touch sensor could sense the touch start at borders, slightly inside or outside of them on the display, and move a portion of the original image of the display, in order to let the user touch an object point. An operating system or specific application program can use this method by moving the image of the display partially and temporarily fixing the moved image. If the user touches one point in the moved image as a mid touch, the system or program can activate a linked function by matching the coordinates of the following touch and the location in the moved image. The touch control methods according to the present invention can be applied to various functions and processes in the operating systems and application programs. For example, the subject matters of the present invention may be used in application programs, such as in browser programs, map programs, banking programs, telephone dialing programs or SNS programs to help distant touch pointing. Besides, the present invention can be applied to every status or application in portable touch devices.

Conditions to move the image presented on the display can be selected as diverse combinations. For example, when an expected touch start is sensed around one border of the display, the image movement mode can be activated and the image movement can be defined or adjusted referring to the location of the touch start and the direction of the touch moving. Additionally, when the touch start is sensed around one corner border of the display, the moved image can provide an image area around an opposite corner border of the display to be exposed from the one corner of the display. Additionally, when the touch start is sensed around one horizontal border of the display, the moved image can provide an image area around an opposite horizontal border to be exposed from the one horizontal border of the display. Additionally, when the touch start is sensed around one vertical border of the display, the moved image can provide an image area around an opposite vertical border to be exposed from the one vertical border of the display.

In other cases relating to the direction of the touch moving, when the touch moving directs inclinedly, the moved image can provide an image area around an opposite corner border of the display, where the touch moving directs, to be exposed from one corner border of the display which opposite to the opposite corner border. Additionally, when the touch moving directs horizontally, the moved image can provide an image area around an opposite vertical border of the display, where the touch moving directs, to be exposed from one vertical border of the display which opposite to the opposite vertical border. Additionally, when the touch moving directs vertically, the moved image can provide an image area around an opposite horizontal border of the display, where the touch moving directs, to be exposed from one horizontal border of the display which opposite to the opposite horizontal border.

In case of moving the image as the above, the user can adjust the size of the moved image, proportionally to a distance of the touch moving, and can temporarily fix the size of the moved image by stopping the touch moving. A following mid touch can be decided when another touch is sensed at another location which is different from the temporarily stop location of the touch moving. Namely, when another touch signal is encountered after touch signal of the touch moving disappears, the following mid touch can be defined at that location.

By matching the location of the following mid touch and the coordinates in the moved window image, activated is the linked function, such as clicks, button input of the object position and the like. After activating the linked function, the original image before the moved image may be restored. Sometimes another image may be displayed related to the linked function without restoring the original image.

To move the image presented on the display, an image movement mode may be defined, that can be activated under predetermined conditions. As one embodiment, the image movement mode can be activated when a touch is maintained in a predetermined period, for example 1 or 2 seconds, around a border of the display as the touch start. Under the image movement mode, the touch sensor can focus on the expected touch, its movement, its holding time, its pattern and the like.

In another embodiment, the image movement mode may be activated when repeated times of touches are sensed around the same location on the display as the touch start. The image movement mode can be activated when a button input is sensed. The button input may be the input of the physical button of the device or of graphical button virtually presented on the display. The moved image can be presented directly after the button input or by waiting for the touch start and the touch moving.

Advantageous Effect

According to the present invention, provided is a useful user interface which help user touch precisely and easily where he or she desires with only one hand holding the device. The present invention may reduce the possibilities of user inconvenience or unexpected accidents, which can occur in using portable devices having large-scale display.

BRIEF DESCRIPTION OF DRAWINGS

FIG. 1 is a front view for explaining a touch control method according to one embodiment of the present invention.

FIGS. 2 to 4 are front views explaining touch control methods in detail according to embodiments of the present invention.

FIGS. 5 to 7 are front views illustrating touch control methods in detail according to the other embodiments of the present invention.

EMBODIMENTS OF THE INVENTION

Hereinafter, the embodiments of the invention are described as being operated in a internet browser. However, according to other embodiments of the invention, the invention may be applied to many cases, such as settings, other applications, home screen, phone dialing, message inputting and the like, in a portable device having a touch sensing function.

FIG. 1 is a front view for explaining a touch control method according to one embodiment of the present invention.

Referring to FIG. 1, a portable device 100 has a large touch display 110. The display 110 may provide a touch sensor (not shown) thereon or touch sensing function like on-cell or in-cell touch display. In general, the touch sensor matches the computed coordinates of the touched location and the coordinates presented in the display and the device can perform a linked function relating to the matched location.

In this specification, the "linked function" may mean a hyperlink defined at the predetermined position, or may mean a click of a graphic button, for example reward, forward, bookmark and the like, which is of browser or other applications.

The R-R line shown in FIG. 1 may mean a range where a finger can approach when the user grabs the device 100. Conventionally, to approach a position beyond the R-R line, users must use two hands or release the holding of the device disquietly to expand the range of the finger.

FIGS. 2 to 4 are front views explaining touch control methods in detail according to embodiments of the present invention.

Referring to FIG. 2, the user is holding a big-sized portable device. Maybe he or she might not reach nor touch a cart icon that is far away, while holding the device safely.

In this instance, the user might do the touch start by keeping a touch on a left lower corner for 2 seconds or predetermined period with the thumb finger. Responding to the touch start kept on the corner border for 2 seconds or more, the device may activate an image movement mode. The system or application of the device may wait for a touch moving after the touch start.

The user may move the very finger for the touch start for the touch moving, keeping the touch start, toward the center of the display or the diagonally opposite corner border. Responding to the user's touch moving, a portion of the original display which is located around the diagonally opposite corner border, namely around the right upper edge, may be exposed from the left lower corner border. To distinguish the moved image from the original display image, a neon border line or shadowed border line may be added on the border of the moved image.

When the moved image near the right upper region is moved to the left lower region, the user's thumb finger can reach and touch the desired cart icon. To wait for the user's following touch, the moved image may temporarily stop and not disappear. The user can perform the following touch by touch the desired cart icon in a predetermined time.

The operating system or the application in the device may mutually match the coordinates in the moved image and coordinates of the following touch on the touch sensor, and may perform a linked function by matching the coordinates the following touch in the moved image and in the original display. Matching the coordinates of before-moving and after-moving may be obvious, so the present specification may skip a detail description for it.

If the following touch can specify the position of the cart icon by matching the coordinates, the device can perform the linked function. As the cart icon of the original display is touched, the display may be transferred to a cart display directly. In another case, after the following touch, the present good may be added to the cart and the original image of the display may be restored.

In the present embodiment, the image movement mode is activated responding to the location of the touch start. However, in other embodiments, the image movement mode may be activated responding to repeated number of the touch start, pre-gesture of the touch start, button input replacing the touch start and the like.

Also, in the present embodiment, the moved image represents the image area around the right upper corner border, because the touch start begins at the left lower corner border. However, in other embodiments, moved images represent various image areas with various aspects according to directions of touch moving.

Also, if the image movement mode is activated once, the touch moving may start at the inside of the display.

Referring to FIG. 3, the user is holding the device with the left hand. It is supposed that he can't touch a banner while holding the device safely.

In this instance, the user begins a touch start at the middle of the lower horizontal border, preferably by touching once, or keeping it for 2 seconds, or repeating on the same point 2~3 times. Responding to the predetermined condition for the touch start, the image movement mode may be activated.

The user follows a touch moving toward the center of the display or toward the opposite horizontal border, by keeping the finger contact for the touch start. Responding to the following touch moving, a portion of the original display which is located around the opposite horizontal border, namely around the upper horizontal edge, may be exposed from the lower horizontal border. To distinguish the moved image from the original display image, a neon border line or shadowed border line may be added on the border of the moved image.

As the image area around the upper border is moved to the lower border, the user's thumb finger can reach and touch the desired banner, and the user can perform a following touch. The moved image may temporarily stop and wait for the following touch in a predetermined time. The user can perform the following touch by touching the copied banner image in the moved image.

In the present embodiment, the moved image may be altered proportional to a distance of the touch moving. However, in other embodiments, the height of the moved image may be fixed, for example 50% or 30% of the display.

In either embodiment, the operating system or the application in the device can match the coordinates in the moved image with the coordinates of the following touch on the touch sensor, so as to perform a linked function by matching the coordinates of the touch point in the moved image with the coordinates in the original display.

If the following touch matches with the location of the banner, the portable device may perform the linked function hyperlinked to the banner.

In the present embodiment, the touch start is sensed at the lower border and the moved image represents the image area of upper part of the display. However, in other embodiments, the touch start may be sensed at the upper border or the touch moving may direct to a left or right side.

Also, if the image movement mode is activated once, the touch moving may start at the inside of the display.

Referring to FIG. 4, the user is holding the device with the right hand. It is supposed that he would like to touch a homepage icon located on the upper left side of the display to move the home page.

In this instance, the user begins a touch start at the middle of the right vertical border, preferably by touching once, or keeping it for 2 seconds, or repeating on the same point 2~3 times. Responding to the predetermined condition for the touch start, the image movement mode may be activated.

The user follows a touch moving toward the center of the display or toward the opposite left vertical border, by keeping the finger contact for the touch start. Responding to the following touch moving, a portion of the original display which is located around the opposite left vertical border, namely around the left vertical edge, may be moved near to the right vertical border. To distinguish the moved image from the original display image, a neon border line or shadowed border line may be added on the border of the moved image. Otherwise, the moved image may be expressed relatively bright, however the original display may be expressed relatively darkened or restricted to no touch function.

As the image area around the left side border is moved to the right side border, the user's thumb finger can reach and touch the desired homepage icon, and the user can perform a following touch. The moved image may temporarily stop and wait for the following touch in a predetermined time. The user can perform the following touch by touching the copied homepage icon image in the moved image.

In the present embodiment, the moved image may be altered proportional to a distance of the touch moving. However, in other embodiments, the width of the moved image may be fixed, for example 50% of the display.

In either embodiment, the operating system or the application in the device can match the coordinates in the moved image with the coordinates of the following touch on the touch sensor, so as to perform a linked function by matching the coordinates of the touch point in the moved image with the coordinates in the original display.

In the present embodiment, the touch start is sensed at the right side border and the moved image represents the image area of left side part of the display. However, in other embodiments, the touch start may be sensed at the left side border or the touch moving may direct up and down.

Also, if the image movement mode is activated once, the touch moving may start at the inside of the display.

As described in the embodiments of FIGS. 3 and 4, the size of the moved image may be altered proportional to the distance of the finger movement and the remaining area may express the original display image. However, in other embodiments, the remaining area may be successively moved and changed, according to the change of the moved image.

FIGS. 5 to 7 are front views illustrating touch control methods in detail according to the other embodiments of the present invention.

Referring to FIG. 5, the user is holding a portable device with a left hand like FIG. 2, and it is supposed that he can't touch a cart icon easily.

The user can activate an image movement mode by keeping a touch on a corner border for 2 seconds, and do a touch moving by sliding the finger tip for the touch start toward the center of the display or the diagonally opposite corner border, while keeping the finger touch. Responding to the touch moving, an image area around the corner border, namely right upper part of the display, may be exposed from the left lower corner border. To distinguish the moved image from the original display, a popup band for advertisement may be provided along the border of the moved image. The popup band may be formed on all the borders of the moved image or may be formed on one or two sides of it. A neon border line or shadowed border line may be added on the border of the moved image.

As shown in FIG. 6, a popup band may be provided on a upper border of the moved image, while, as shown in FIG. 7, another popup band may be provided on a vertical border of the moved image. The moved image may be expressed relatively bright, while the original display may be expressed relatively darkened or restricted to no touch function.

In the present invention, the popup band may include any types of contents which a service provider wants to express for commercial or non-commercial purpose. The contents for the popup bands may be variously selected according to their purposes, regularly or irregularly. The popup bands may be selected by referring to various parameters, such as the kind of the present application or the present internet site, the user's recent keywords, and the like. The popup band may include commercial advertisement, public service advertisement, announcement, present time, message notice, mail notice, event guide, etc.

The invention claimed is:

1. A touch control method of a portable device which includes a display and a touch sensor relating to the display, the method comprising:
    sensing user's touch start and touch moving toward one direction on the touch sensor;
    moving an image presented on the display according to the user's touch moving;
    temporarily fixing the moved image;
    sensing user's following touch on the moved image; and
    activating a linked function by using coordinates of the following touch on the moved image, wherein the moved image provides an image area around an opposite border of the display to be exposed from one border of the display.

2. The touch control method of claim 1, when the touch start is sensed around one corner border of the display, wherein the moved image provides an image area around an opposite corner border of the display to be exposed from the one corner of the display.

3. The touch control method of claim 1, when the touch start is sensed around one horizontal border of the display, wherein the moved image provides an image area around an opposite horizontal border to be exposed from the one horizontal border of the display.

4. The touch control method of claim 1, when the touch start is sensed around one vertical border of the display, wherein the moved image provides an image area around an opposite vertical border to be exposed from the one vertical border of the display.

5. The touch control method of claim 1, when the touch moving directs inclinedly, wherein the moved image provides an image area around an opposite corner border of the display, where the touch moving directs, to be exposed from one corner border of the display which opposite to the opposite corner border.

6. The touch control method of claim 1, when the touch moving directs horizontally, wherein the moved image provides an image area around an opposite vertical border of the display, where the touch moving directs, to be exposed from one vertical border of the display which opposite to the opposite vertical border.

7. The touch control method of claim 1, when the touch moving directs vertically, wherein the moved image provides an image area around an opposite horizontal border of the display, where the touch moving directs, to be exposed from one horizontal border of the display which opposite to the opposite horizontal border.

8. The touch control method of claim 1, wherein the moved image is altered proportional to a distance of the touch moving and temporarily fixed.

9. The touch control method of claim 1, wherein the moved image is fixed when the touch moving temporarily stops, and the following touch is defined on another touch when the another touch is sensed at a different position after the temporary stop of the touch moving.

10. The touch control method of claim 1, further comprising restoring the original image of the display from the moved image after activating the linked function.

11. The touch control method of claim 1, further comprising activating image movement mode before moving the image presented on the display.

12. The touch control method of claim 11, wherein the image movement mode is activated when a touch is maintained in a predetermined period around a border of the display as the touch start.

13. The touch control method of claim 11, wherein the image movement mode is activated when repeated times of touches are sensed around the same location on the display as the touch start.

14. The touch control method of claim 11, wherein the image movement mode is activated when a button input is sensed from a button of the portable device before the touch start.

15. The touch control method of claim 1, further comprising providing a popup band formed along the at least one border of the moved image.

* * * * *